(12) United States Patent
Branly

(10) Patent No.: US 8,259,391 B2
(45) Date of Patent: Sep. 4, 2012

(54) AMPLIFICATION DEVICE COMPRISING A LASER AMPLIFYING MEDIUM OF PARALLELEPIPED SHAPE AND PUMPING MEANS COMPRISING LAMPS

(75) Inventor: Stéphane Branly, Brières-lès-Scellés (FR)

(73) Assignee: Thales, Neuilly sur Seine (FR)

( * ) Notice: Subject to any disclaimer, the term of this patent is extended or adjusted under 35 U.S.C. 154(b) by 567 days.

(21) Appl. No.: 12/438,568

(22) PCT Filed: Aug. 29, 2007

(86) PCT No.: PCT/EP2007/059014
§ 371 (c)(1),
(2), (4) Date: Mar. 17, 2009

(87) PCT Pub. No.: WO2008/025807
PCT Pub. Date: Mar. 6, 2008

(65) Prior Publication Data
US 2009/0323754 A1    Dec. 31, 2009

(30) Foreign Application Priority Data
Aug. 30, 2006    (FR) .................................. 06 07623

(51) Int. Cl.
  H01S 3/04    (2006.01)
  H01S 3/16    (2006.01)
  H01S 3/06    (2006.01)
  H01S 3/092   (2006.01)
(52) U.S. Cl. ............ 359/345; 372/35; 372/41; 372/66; 372/70

(58) Field of Classification Search ............... 372/35, 372/41, 66, 70; 359/333, 345
See application file for complete search history.

(56) References Cited

U.S. PATENT DOCUMENTS

| 4,207,541 A * | 6/1980 | Karger et al. ............. 372/35 |
| 4,902,127 A * | 2/1990 | Byer et al. ............. 356/28.5 |
| 6,021,154 A * | 2/2000 | Unternahrer ............. 372/108 |
| 2003/0161365 A1* | 8/2003 | Perry et al. ............. 372/35 |

FOREIGN PATENT DOCUMENTS

| FR | 2593615 A1 * | 7/1987 |
| JP | 2000261070 A * | 9/2000 |
| WO | WO95/31843 | 11/1995 |

OTHER PUBLICATIONS

Yagi et al. "Nd<3+>:Y3A15012 Laser Ceramics: Flashlamp Pumped Laser Operation with a UV Cut Filter." Journal of Alloys and Compounds Elsevier Switzerland, vol. 421, No. 1-2, Dec. 15, 2005-Sep. 14, 2006, pp. 195-199, XP002435773, Available online Dec. 15, 2005, ISSN: 0925-8388.

(Continued)

Primary Examiner — Eric Bolda
(74) Attorney, Agent, or Firm — Lowe, Hauptman, Ham & Berner, LLP

(57) ABSTRACT

The present invention relates to an amplification device comprising an amplifying medium (2) of parallelepiped shape and pumping means comprising lamps (5) emitting first radiation in a frequency range useful for the amplification and second radiation capable of degrading the amplifying medium. It is characterized in that lamps (5) are integrated into a jacket (3) that absorbs at least some of the second radiation.

15 Claims, 3 Drawing Sheets

OTHER PUBLICATIONS

Qitao, Lu et al. "The Influence of Ultra-Violet Cut-Off Filters on the Performance of a 200 W CR:ND:GGG Slab Laser." Optics and Laser Technology, Elsevier Science Publishers BV., Amsterdam, NL, vol. 24, No. 5, Oct. 1, 1992, pp. 267-271, XP000320270, ISSN: 0030-3992.

Barnes et al. "Solid-State Laser Technology." 1973 IEEE/OSSA Conference on Laser Engineering and Applications May 30-Jun. 1, 1973, Washington, DC, USA, vol. QE-10, No. 2, Feb. 1974, pp. 195-201, XP002435774, IEEE Journal of Quantum Electronics USA, ISSN: 0018-9197.

Hitz, Breck, "Ceramic Nd:YAG Laser Generates 144 W." Photonics Research [Online] Jun. 1, 2006, XP002435775, Extrait de L'Internet: URL:http:/www.photonics.com//content/spectra/2006/june/research/82886.aspx>.

* cited by examiner

AMPLIFICATION DEVICE COMPRISING A LASER AMPLIFYING MEDIUM OF PARALLELEPIPED SHAPE AND PUMPING MEANS COMPRISING LAMPS

CROSS REFERENCE TO RELATED APPLICATIONS

The present Application is based on International Application No. PCT/EP2007/059014, filed on Aug. 29, 2007, which in turn corresponds to French Application No. 0607623, filed on Aug. 30, 2006, and priority is hereby claimed under 35 USC §119 based on these applications. Each of these applications are hereby incorporated by reference in their entirety into the present application.

TECHNICAL FIELD

The field of the invention is that of laser amplification devices having an amplifying medium of parallelepiped shape and applies notably to lamp-pumped nanosecond, picosecond or even femtosecond lasers.

BACKGROUND OF THE INVENTION

In the field of laser amplification devices having a solid-state lasing medium, until recently there existed two broad types of amplifying materials:
  firstly, single-crystal materials, for example yttrium aluminum garnet (also called YAG), sapphire or ruby. These materials are generally doped, for example with rare-earth ions or with titanium or chromium;
  secondly, amorphous matrices, such as phosphate glass for example or silicate glass. These matrices are mainly doped with rare-earth ions.

In general, amplification devices with a single-crystal amplifying medium, of the YAG matrix type for example, make it possible to achieve high repetition rates but at modest beam energies. This energy limitation is due to the limited cross section of single-crystal amplifying media, said limitation being set by the crystal growing process. For example, the difficulty of growing single-crystal neodymium-doped YAG, referred to as Nd:YAG, over large cross sections and the limitation of its damage threshold make it possible at best to obtain energies of around 4 to 5 joules for a 2 $cm^2$ cross section, in pulsed mode with a laser pulse duration of a few nanoseconds.

Moreover, amplification devices comprising a glass amplifying medium can achieve high beam energies, ranging from around ten joules to several kilojoules, but at respective rates ranging from one Hz to less than one laser shot per hour. The high energies are permitted thanks to the large possible cross sections of such an amplifying medium. There is no limitation on the cross section in the case of glass matrices, unlike in single crystals. However, glass matrices, because of their poor thermomechanical properties, prevent the laser rates from being increased and sometimes require, notably, the use of complex means of compensating for wavefront distortion.

The main techniques for optically pumping solid-state amplifying media comprise, on the one hand, continuous lamp or flashlamp pumping and, on the other hand, continuous or pulsed laser diode pumping.

The main characteristics of each of these optical pumping techniques are the following:
  continuous lamps emit a multi-line spectrum superimposed on quite a low continuum;
  flashlamps emit a spectrum essentially consisting of a continuum on which low-intensity spectral lines are superposed. The spectral position of the emission lines depends on the gas or gases used in the lamp; and
  laser diodes emit a single spectral line, which depends on the semiconductor used.

When a lasing material is pumped by one of these techniques, it becomes an amplifier for one or more characteristic wavelengths.

Each of these two pumping techniques has advantages and disadvantages, the main ones of which are the following:
  when a lasing material is lamp-pumped, only a small part of the emission spectrum of the lamp is useful for pumping, the other part being partially thermally dissipated in the lasing medium. This thermal dissipation, if it becomes too high, may induce distortions of the wavefront and/or birefringence limiting possible applications of the laser;
  the lifetime of the continuous lamps and flashlamps is often much shorter than that of continuous diodes and pulsed diodes respectively. As a result, maintenance operations on lamp-pumped lasers are carried out more frequently;
  for the same performance, the cost of lamp-pumped amplifiers is much lower than that of diode-pumped amplifiers;
  for a number of lasing materials, there are pump diodes that emit at a wavelength coinciding with one of their absorption lines. Consequently, the thermal dissipation in the amplifying medium is reduced and the induced deleterious effects (wavefront distortion, induced birefringence, etc.) are reduced. Thus, with continuous pumping it is possible to obtain a higher average power output by the laser if it is diode-pumped rather than lamp-pumped. Furthermore, with pulsed pumping, the same output laser energies are obtained irrespective of the type of pump (flashlamp or diode), but higher repetition rates may be achieved with diode pumping; and
  the cost of diodes is much higher than that of lamps, and therefore the cost of maintaining them under operational conditions may be higher than that for a lamp-pumped laser.

Thus, notably in the field of pulsed lasers, it is possible at the present time to manufacture:
  solid-state laser amplifiers delivering high energies, of the type comprising glass-based lasing materials, but at very low repetition rates because of the thermal effects if they are flashlamp-pumped;
  solid-state laser amplifiers delivering high energies, of the type comprising glass-based lasing materials, but at low repetition rates because of the thermal effects and at very high costs if they are diode-pumped;
  flashlamp-pumped solid-state laser amplifiers operating at intermediate repetition rates, of the order of 10 to 100 Hz, thanks to the use of certain single-crystal lasing materials having good thermomechanical properties, but delivering energies limited to a few joules owing to the limited cross section of the crystals that can be achieved by crystal growth; and
  expensive diode-pumped solid-state laser amplifiers operating at high repetition rates, at more than 50 Hz, thanks to the use of certain single-crystal lasing materials having good thermomechanical properties but delivering energies limited to a few joules owing to the limited cross section of the crystals that can be obtained by crystal growth.

The appearance of new lasing materials that combine the advantages of glass matrices, having large available cross sections enabling high energies to be achieved, with those of the best single-crystal materials having good thermomechanical properties, opens up new prospects.

These new lasing materials are polycrystalline solid-state structures, also called laser ceramics.

It is now possible to produce laser amplifier devices delivering at the same time high energies at intermediate repetition rates in the case of flashlamp pumping, or high repetition rates in the case of diode pumping.

The choice of pumping technique is therefore mainly guided by purchase cost and maintenance cost considerations. To pump amplifying medium volumes possibly in excess of 200 cm$^3$, compared to about 20 cm$^3$ previously, the acquisition cost of a diode-pumped amplification device may be high. Therefore lamp pumping becomes a worthwhile alternative for industrial manufacturers.

For example, a YAG ceramic doped with Nd$^{3+}$ rare-earth ions, owing to its polycrystalline structure that allows large amplifying media to be obtained, having a cross section exceeding 20 cm$^2$ with an Nd:YAG single crystal, may be employed for producing high-energy amplification devices. These energies obtained are around several tens of joules, thus exceeding the 4 to 5 joules usually obtained. The rates achieved greatly exceed 10 Hz.

However, there are certain problems when pumping laser ceramics by lamps. Part of the emission spectrum of the lamps lies within the ultraviolet. This radiation can damage laser ceramics as it induces a solarization effect which ultimately degrades the optical properties of the laser ceramic used as amplifying medium. Consequently, when designing laser amplification devices using laser ceramics, it is necessary to employ techniques that prevent the laser ceramic from being degraded by the ultraviolet radiation of the lamps.

It is conceivable with these laser ceramics to produce new lasers that can deliver high average power levels with a much lower average cost per watt than with the complex solutions currently used, of the type in which the number of lasers is increased or the beams are multiplexed together.

SUMMARY OF THE INVENTION

The device proposed in the invention combines the use of materials that can be produced in a large size in the form of parallelepipedal rods, for example the ceramic YAG doped with Nd$^{3+}$ rare-earth ions, and means for filtering out the undesirable radiation.

An object of the amplification device, comprising an amplifying medium of parallelepiped shape and pumping means comprising lamps emitting first radiation in a frequency range useful for the amplification and second radiation capable of degrading the amplifying medium, is to integrate lamps into a jacket that absorbs at least some of the second radiation.

The main advantage of these amplifying materials, for example of the type comprising a ceramic doped with rare-earth ions, is that their manufacture no longer imposes a size limit on production. Thus, the amplifying media may be larger and the optical pumping greater.

Laser beam amplification is then possible at energies of several tens of joules for pulsed lasers at rates exceeding 10 Hz. For continuous lasers, laser beam amplification at power levels of several tens of kilowatts is achievable.

According to one embodiment of the invention, the device uses flashlamps integrated in the jacket.

According to one embodiment of the invention, the device comprises a ceramic-based amplifying medium.

According to one embodiment of the invention, the device comprises an amplifying medium made of a YAG ceramic doped with Nd$^{3+}$ ions.

According to one embodiment of the invention, the device comprises an amplifying medium made of a YAG ceramic doped with Nd$^{3+}$ ions and co-doped with Cr$^{3+}$ ions.

According to one embodiment of the invention, the pumping device is symmetrical with respect to the plane formed by the amplifying medium.

According to one embodiment of the invention, at least two opposed faces of the amplifying medium are inclined to each other at an angle of a few degrees by rotation about the Oy axis, and in this case the amplifying medium has a quasi-parallelepiped shape.

According to one embodiment of the invention, the device comprises a jacket made of a material based on quartz or glass doped with samarium ions.

According to one embodiment of the invention, the device comprises a jacket containing lamps emitting second radiation in the UV.

According to one embodiment of the invention, the device comprises a jacket that absorbs the photons which have a spectrum coinciding with the laser emission line of the amplifying medium.

According to one embodiment of the invention, the device includes means for cooling the amplifying medium, comprising the circulation of a coolant.

According to one embodiment of the invention, the device comprises means for cooling the lamps.

According to one embodiment of the invention, the device comprises a jacket possessing openings that differ in cross section from one another so as to control the flow rate of the coolant inside the jacket.

According to one embodiment of the invention, the device comprises a UV filter placed between the jacket and the amplifying medium.

According to one embodiment of the invention, the device comprises an optical diffusing medium covering or surrounding the jacket, having the function of uniformizing the pumping of the amplifying medium.

According to one embodiment of the invention, the device comprises a diffusing medium made of a tamped MgO powder in a covering or an undoped ceramic.

Still other objects and advantages of the present invention will become readily apparent to those skilled in the art from the following detailed description, wherein the preferred embodiments of the invention are shown and described, simply by way of illustration of the best mode contemplated of carrying out the invention. As will be realized, the invention is capable of other and different embodiments, and its several details are capable of modifications in various obvious aspects, all without departing from the invention. Accordingly, the drawings and description thereof are to be regarded as illustrative in nature, and not as restrictive.

BRIEF DESCRIPTION OF THE DRAWINGS

The present invention is illustrated by way of example, and not by limitation, in the figures of the accompanying drawings, wherein elements having the same reference numeral designations represent like elements throughout and wherein.

DETAILED DESCRIPTION OF THE INVENTION

Figure 1:
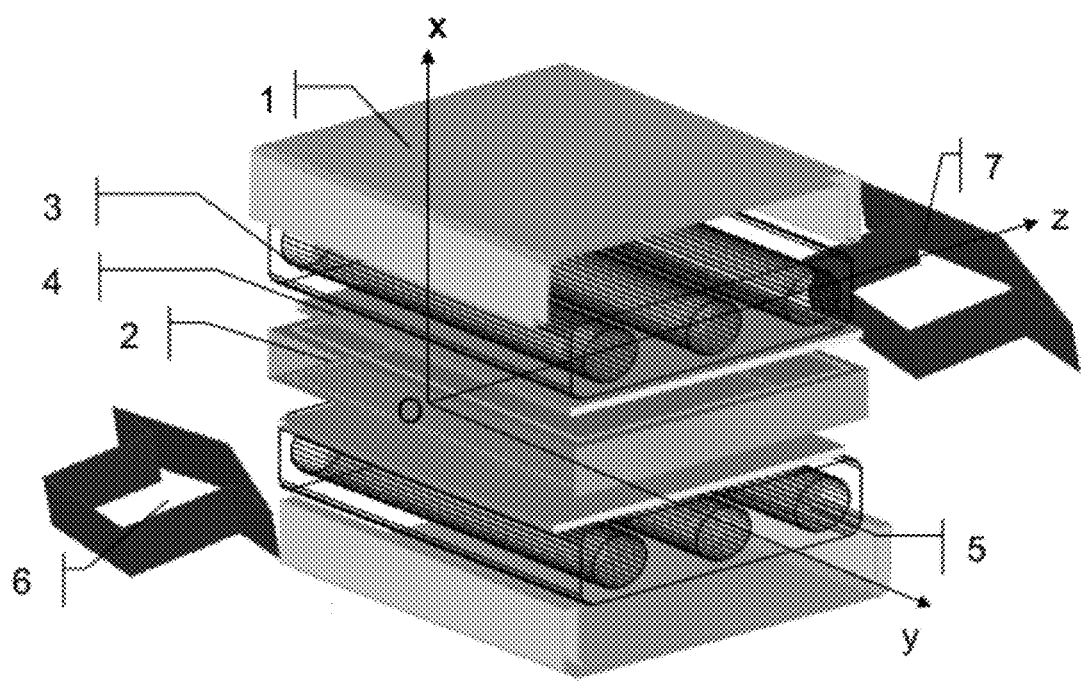
FIG. 1 shows an exploded perspective view of an example of the amplification device according to the invention.

FIG. 1 shows an example of an amplification device, in an exploded perspective view, comprising an amplifying medium 2 of parallelepiped shape made of a ceramic doped with one or more types of rare-earth or other ions. These ions may typically be neodymium or ytterbium ions. The ceramic may be co-doped with $Cr^{3+}$ ions. The amplifying medium has two large faces, which face the pumping lamps 5. The pumping takes place perpendicular to these faces. The beam 6 passes through the amplifying medium via its lateral face perpendicular to the axis of the lamps and creates, after its passage through the device, an amplified beam 7.

The lamps, for example flashlamps 5, are placed in a jacket 3 that has three functions:

this jacket, made of a quartz/glass material doped for example with samarium ions, can absorb all or some of the UV radiation emitted by the lamps;

it absorbs the photons emitted by the lamps having a spectrum coinciding with the laser emission line of the amplifying medium. This line is for example at 1064 nm for an $Nd^{3+}$-doped YAG ceramic. This function prevents depopulation of the laser gain along the Ox axis, by lamp-stimulated emission; and it provides a sufficient speed of the coolant, intended to cool the lamps and the amplifying medium. This coolant thus removes a large part of the heat caused by the radiation of the lamps.

Advantageously, a UV filter 4 may be placed on either side of the large faces of the amplifying medium 2, between the jacket and the amplifying medium. This UV filter plays a redundant role with that of the jacket. However, this filter is optional, depending on the UV power emitted by the lamps. The filter is shown as an example in FIG. 1.

The amplifying medium includes means for achieving uniform pumping. An optical diffusing medium 1, called a diffuser, is used to make the pumping of the amplifying medium uniform, the radiation received by the amplifying medium being the sum of the direct radiation emitted by the lamps and the radiation reflected by the diffuser. The objective of the diffuser is to diffuse the useful radiation in the amplifying medium as uniformly as possible, therefore between the lamps. The geometry of the optical diffuser is designed to uniformize the radiation received by the amplifying medium. For example, each lamp may be at the focus of a parabola formed by the optical diffuser.

In addition, the symmetry of the device also ensures that the pumping in the amplifying medium is homogeneous. The incident laser beam 6 enters the amplifying medium via the face formed in the Oxy plane. Since, on the one hand, the laser beam propagation axis Oz is perpendicular to the axis of the lamps Oy and because, on the other hand, of the symmetry of the device with respect to the Oyz plane, the pumping is symmetrical in the amplifying medium in the Oyz plane. The pumping is therefore very homogeneous in the Oyz plane.

Furthermore, the symmetry of the device has another advantage—it prevents any twisting of the amplifying medium.

Figure 2:
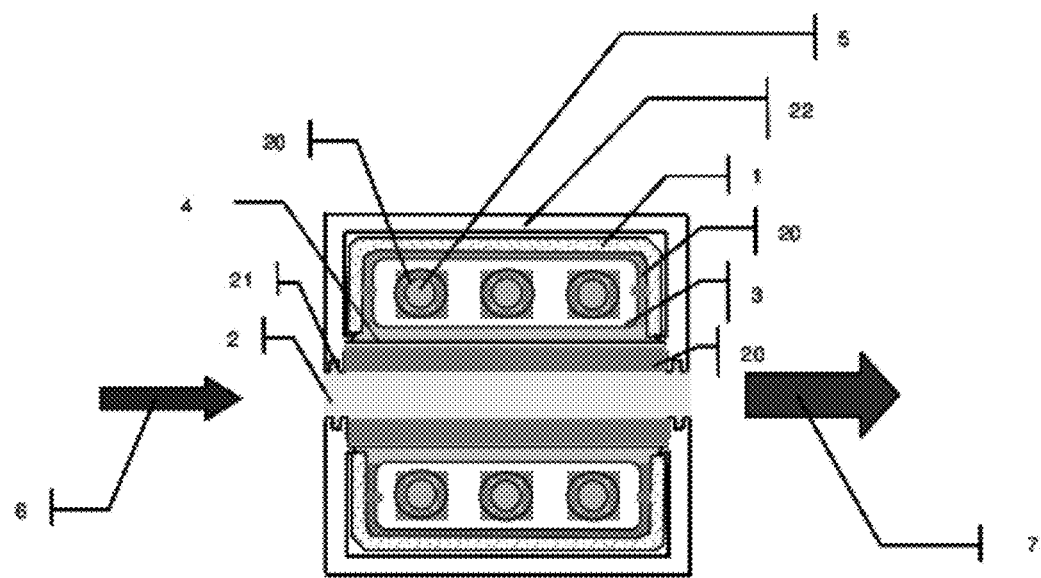
FIG. 2 shows a section plane of FIG. 1.

FIG. 2 shows a section in the Oxz plane of the device of FIG. 1. The powerful radiation emitted by the lamps has the drawback of heating the amplifying medium and degrading its optical properties. To offset this, two cooling devices are placed in the structure. A coolant 20 is introduced on either side of the amplifying medium 2 and flows along its largest-area faces (the Oyz plane of FIG. 1), thereby controlling some of the heat of the pumping device. A cooling device may also be integrated into the jacket 3. The latter has openings of different cross sections so as to control the flow rate of the coolant 20 inside the jacket. The coolant therefore flows inside the jacket around the lamps 5 and around the jacket. The latter cooling device helps to remove the heat caused by the radiation of the lamps and limits the heat-up of the amplifying medium.

The jacket 3 is confined in the diffuser 1. The diffuser 1 consists of a container transparent to the radiation of the lamps, in which for example an MgO powder may be tamped. Optionally, an undoped ceramic may be used in another situation. The function of this medium is to diffuse the light emitted by the lamps, by reflecting it. The shape of the diffuser may be optimized and may vary from the situation shown in FIG. 2.

The diffuser 1, the coolant 20, the jacket 3 and the UV filter 4 are inserted into a coolant-tight enclosure 22. For this purpose, seals 21 fix the enclosure to the amplifying medium 2. Since the device is symmetrical with respect to the Oyz main plane formed by the largest median surface of the amplifying medium, the enclosure 22 comprising the elements described above lies on either side of this medium.

On the one hand, the symmetry of the pumping device is beneficial for homogeneously and symmetrically cooling the amplifying medium, thus limiting the mechanical deformation of the latter due to the thermal dissipation. On the other hand, owing to the symmetry of the pumping device, the birefringence induced by the thermomechanical stresses on the amplifying medium appears with optical axes along Ox and Oy respectively. Thus, any polarized laser beam along one of its axes, and amplified, in the amplifying medium, will remain polarized over the entire cross section of the beam. This device has the advantage, on pumping structures produced with a cylindrical laser rod, of not introducing spatially dependent depolarization effects on the amplified beam.

Figure 3:
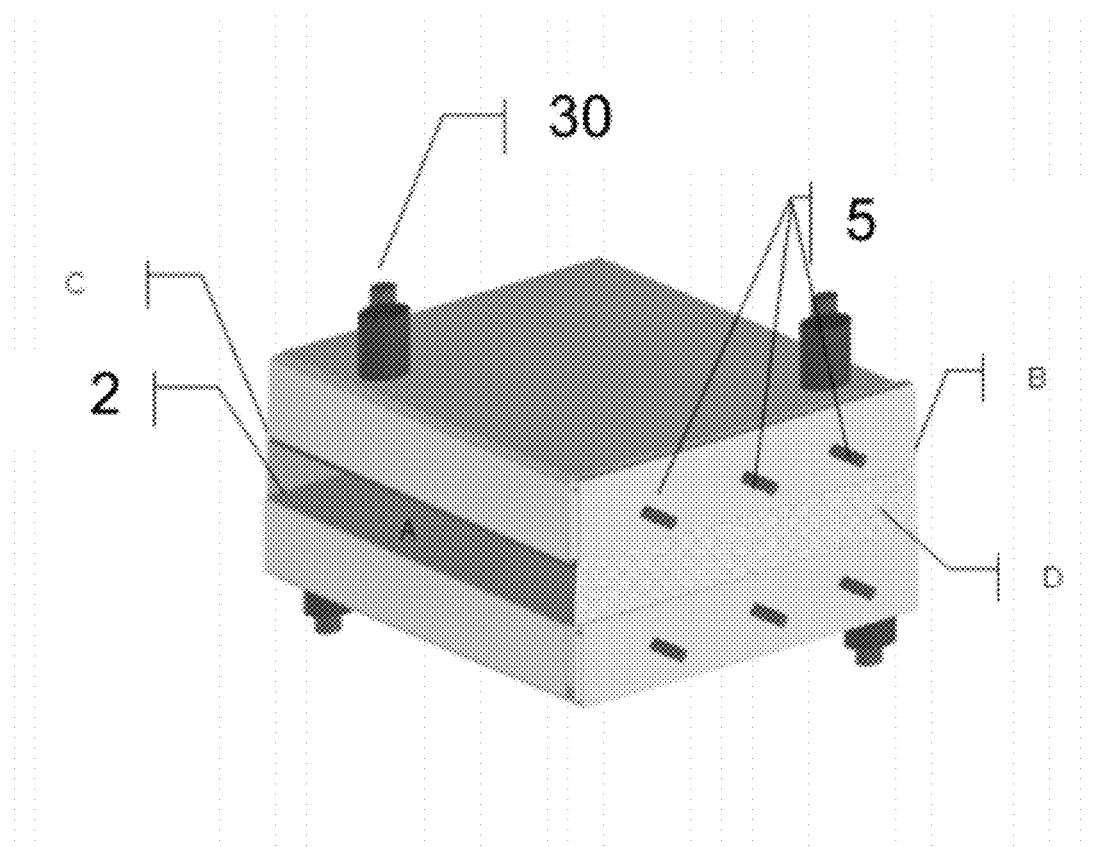
FIG. 3 shows a complete view of an example of the amplification device integrating cooling means according to the invention.

FIG. 3 shows an example of an amplification device that includes fluid connectors 30 for injecting and discharging the coolant. By controlling the flow rate of the coolant, it is possible to adjust the temperature of the pumping device. The heat-up caused by the lamps is controlled, and the lifetime and the deformations of the amplifying medium are made to conform to the requirements.

The incident laser beams enter the amplifying medium via the face A and emerge amplified from the face B. By making the amplifying medium be formed from an ion (for example rare earth ion)-doped ceramic, it is possible to produce areas of faces A and B of much greater than 2 $cm^2$, the maximum area achievable for a YAG single crystal for example. The dimensions of the amplifying media may be very large because of the very manufacturing process, which no longer involves crystal growth but instead the manufacture of the ceramic. This area is no longer limited with laser ceramics (for example YAG ceramics doped with rare-earth ions). The large areas therefore make it possible to amplify the beam at energies of several tens of joules in pulsed mode and several tens of thousands of kilowatts in continuous mode.

The lateral faces C and D of the amplifying medium are equipped with a device for preventing parasitic transverse lasing between said faces. This device may be of several types: it may receive an antireflection treatment, antireflecting at the laser wavelength of the amplifying medium, or grooving of the faces C and D and/or delustering of the faces, or the application of one or more absorbent materials on the faces, said material(s) absorbing at the laser emission wavelength of the doped ceramic and providing optical index matching with the laser ceramic.

The faces A and B of the amplifying medium are provided with a device for preventing parasitic prelasing between said faces. This device may be of several types: it may have an antireflection treatment, antireflecting at the laser wavelength of the amplifying medium and/or have the opposed faces A and B inclined at an angle of a few degrees by rotation about the Oy axis: in this case, the amplifying medium becomes quasi-parallelepipedal.

The number of lamps 5, their arrangement and the distance between them are parameters that are optimized for obtaining the most homogeneous possible pumping deposition into the lasing medium. Thus, the choice of optical diffuser and the choice of its shape, in conjunction with adjusting the lamps (number, distance, arrangement), make it possible to achieve the maximum gain with a homogeneous distribution of the pump deposition into the amplifying medium.

Thus, there are several examples of applications, which are not exhaustive, possibly benefiting from the performance of these novel amplifier devices of high average power:

in the field of femtosecond lasers, amplifying media such as titanium-sapphire, denoted by Ti:Sa, or OPCPAs (optical parametric chirped pulse amplifiers) may be used. The short-term objective is to be able to generate peak power levels of the order of 1 petawatt, i.e. of the order of $10^{15}$ watts, at around 10 Hz. To do this, the pump lasers must deliver energies of the order of 100 joules per pulse, at 10 Hz in the visible spectral band corresponding to green. Usually, 120 flashlamp-pumped amplifying media are needed to pump such a laser system, called a petawatt laser, with devices that include Nd:YAG single crystals. Thanks to the device according to the invention, fewer than 25 amplifying devices with Nd:YAG ceramics will now be necessary. The acquisition and maintenance costs will be greatly reduced, the laser systems will be appreciably more compact, and the software control greatly simplified;

the mechanical strength of the surface of certain metals may be improved by laser shock treatment using a laser system comprising for example an Nd:YAG ceramic amplifier capable of delivering pulses of more than 10 J at rates greater than 10 Hz. Prospects for this application are notably found in the aeronautical field; and applications such as for example paint removal, laser ablation, micromachining, cutting or welding of materials, at higher rates than at present, are further examples of possible use of the amplifier device of the invention.

It will be readily seen by one of ordinary skill in the art that the present invention fulfils all of the objects set forth above. After reading the foregoing specification, one of ordinary skill in the art will be able to affect various changes, substitutions of equivalents and various aspects of the invention as broadly disclosed herein. It is therefore intended that the protection granted hereon be limited only by definition contained in the appended claims and equivalents thereof.

The invention claimed is:

1. An amplification device comprising:
   an amplifying medium,
   means for pumping the amplifying medium including lamps which are configured to emit a first radiation for amplification and a second radiation for degrading the amplifying medium in a frequency range, and
   means for cooling the amplifying medium and said means for emitting the first radiation and the second radiation, said means including a circulation of a coolant fluid, wherein
   lamps are integrated into a jacket, and
   said jacket is configured to absorb at least part of the second radiation and has openings with different sections for the circulation of the coolant fluid.

2. The device as claimed in claim 1, wherein the lamps are flashlamps.

3. The device as claimed in claim 2, wherein the amplifying medium is a laser ceramic based.

4. The device as claimed in claim 3, wherein the amplifying medium is a YAG ceramic doped with $Nd^{3+}$ ions.

5. The device as claimed in claim 3, wherein the amplifying medium is a YAG ceramic co-doped with $Cr^{3+}$ ions.

6. The device as claimed in claim 3, wherein the amplifying medium defines an Oyz plane, and the device is symmetrical with respect to the Oyz plane.

7. The device as claimed in claim 6, wherein at least two opposed faces of the amplifying medium are inclined to each other at an angle of a few degrees by rotation about an Oy axis on the Oyz plane, and the amplifying medium has a quasi-parallelepiped shape.

8. The device as claimed in claim 2, wherein the jacket comprises quartz or glass based material doped with samarium ions.

9. The device as claimed in claim 8, wherein the lamps are configured to emit a second UV radiation.

10. The device as claimed in claim 8, wherein the jacket is configured to absorb photons which have a spectrum coinciding with a laser emission line of the amplifying medium.

11. The device as claimed in claim 10, further comprising a UV filter placed between the jacket and the amplifying medium.

12. The device as claimed in claim 11, further comprising an optical diffusing medium which covers the jacket for uniformizing the pumping of the amplifying medium.

13. The device as claimed in claim 12, wherein the diffusing medium is a tamped MgO powder in a container or an undoped ceramic.

14. The device as claimed in claim 7, wherein the jacket comprises quartz or glass based material doped with samarium ions.

15. The device as claimed in claim 1, wherein the amplifying medium has a parallelepiped shape.

* * * * *